United States Patent
Zhao et al.

(10) Patent No.: US 9,246,188 B2
(45) Date of Patent: Jan. 26, 2016

(54) ANTI-PEROVSKITE SOLID ELECTROLYTE COMPOSITIONS

(71) Applicant: Los Alamos National Security LLC, Los Alamos, NM (US)

(72) Inventors: Yusheng Zhao, Las Vegas, NV (US); Luc Louis Daemen, Santa Fe, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 470 days.

(21) Appl. No.: 13/833,124

(22) Filed: Mar. 15, 2013

(65) Prior Publication Data
US 2013/0202971 A1    Aug. 8, 2013

Related U.S. Application Data

(63) Continuation-in-part of application No. PCT/US2012/000093, filed on Feb. 14, 2012.

(60) Provisional application No. 61/442,667, filed on Feb. 14, 2011.

(51) Int. Cl.
*H01M 6/18* (2006.01)
*H01M 10/0562* (2010.01)
*H01G 9/025* (2006.01)
*H01G 11/56* (2013.01)

(52) U.S. Cl.
CPC ........... *H01M 10/0562* (2013.01); *H01G 9/025* (2013.01); *H01G 11/56* (2013.01); *H01M 6/185* (2013.01); *H01M 6/186* (2013.01); *H01M 2300/0071* (2013.01); *Y02E 60/13* (2013.01)

(58) Field of Classification Search
CPC . H01M 6/185; H01M 6/186; H01M 10/0562; H01M 2300/0071
USPC .......................................................... 429/323
See application file for complete search history.

(56) References Cited

U.S. PATENT DOCUMENTS

| | | | |
|---|---|---|---|
| 4,201,760 A | 5/1980 | Arendt et al. | |
| 4,307,163 A | 12/1981 | Joshi et al. | |
| 4,833,050 A | 5/1989 | Whitney et al. | |
| 5,589,296 A | 12/1996 | Iwamoto et al. | |
| 2002/0170386 A1 | 11/2002 | Bond et al. | |
| 2007/0003833 A1 | 1/2007 | Li et al. | |
| 2007/0148553 A1* | 6/2007 | Weppner | C01G 33/006 429/322 |
| 2007/0172739 A1* | 7/2007 | Visco | H01M 12/04 429/322 |
| 2010/0266899 A1 | 10/2010 | Barker et al. | |
| 2011/0008680 A1 | 1/2011 | Muldoon et al. | |

FOREIGN PATENT DOCUMENTS

WO    WO 2012/112229 A2    8/2012

OTHER PUBLICATIONS

International Application No. PCT/US2014/024162: International Search Report and Written Opinion dated Jul. 9, 2014, 14 pages.

* cited by examiner

*Primary Examiner* — Basia Ridley
*Assistant Examiner* — James Erwin
(74) *Attorney, Agent, or Firm* — Lewis Roca Rothgerber LLP (57) ABSTRACT

Solid electrolyte antiperovskite compositions for batteries, capacitors, and other electrochemical devices have chemical formula $Li_3OA$, $Li_{(3-x)}M_{x/2}OA$, $Li_{(3-x)}N_{x/3}OA$, or $LiCOX_zY_{(1-z)}$, wherein M and N are divalent and trivalent metals respectively and wherein A is a halide or mixture of halides, and X and Y are halides.

24 Claims, 5 Drawing Sheets

ANTI-PEROVSKITE SOLID ELECTROLYTE COMPOSITIONS

RELATED APPLICATION

This application is a continuation-in-part of PCT Application No. PCT/US2012/000093, "Anti-Perovskite Solid Electrolyte Compositions" (filed on Feb. 14, 2012), which application claims priority to U.S. Application No. 61/442,667 (filed on Feb. 14, 2011). The entireties of the foregoing applications are incorporated herein by reference for any and all purposes.

STATEMENT REGARDING FEDERAL RIGHTS

This invention was made with government support under Contract No. DE-AC52-06NA25396 awarded by the United States Department of Energy. The government has certain rights in the invention.

TECHNICAL FIELD

The present disclosure relates to solid electrolyte compositions and to devices such as batteries and capacitors employing the compositions.

BACKGROUND

Gel-liquid chemical systems are the electrolytes present in lithium batteries and other electrochemical devices. Gel-liquid chemical systems may include solvents, and the systems utilize solvated lithium ions for ion conduction. To deliver energy at a high rate, these electrolytes must sustain a high capacity for rapid transport of lithium ions to and from the electrodes of the batteries over a broad range of temperatures.

Solvents in lithium batteries promote rapid lithium transport but have certain drawbacks, namely that they can limit the applied voltage, they can allow the formation of lithium dendrites that can short the electronics, they do not allow for operation at high temperatures, and they can leak out of the battery. Improvements in lithium ion transport in solid electrolytes to reach a super-ionic state would allow the application of a lithium metal anode to improve battery performance in terms of high energy density, high temperature function, no electronics shorting, and no fluid leakage. Enhanced lithium transfer rates would also boost ionic conduction and thus improve the battery performance in terms of high power capacity. Accordingly, there is a long-felt need in the art for improved electrolytes.

SUMMARY

In meeting the described long-felt needs, the present disclosure provides, inter alia, solid electrolyte compositions. Solid electrolytes according to this disclosure may be used as electrolytes in lithium batteries, capacitors, and other electrochemical devices. The disclosed solid electrolytes provide advantages over more conventional gel-liquid systems, e.g., they provide excellent lithium ion conduction without dendrite formation. Additionally, the solid electrolytes do not leak from their devices.

The disclosed compositions may comprise a variety of formulas. For example, the disclosed compositions may comprise the formula of, e.g., $Li_3OA$ or even $Li_{(3-x)}M_{(x/2)}OA$ or even $Li_{(3-2x)}M_xOA$, wherein A is a halide, most suitably one of fluoride, chloride, bromide, or iodide or a mixture thereof, wherein M is a divalent metal, e.g., magnesium, calcium, barium, strontium, and mixtures thereof, and wherein $0 \le x \le 3$, wherein $0 \le x \le 2$, or even wherein $0 \le x \le 0.8$. The disclosed compositions may also have the formula $Li_3OX_zY_{(1-z)}$, in which X and Y are halogens, and wherein $0 \le z \le 1$, or where $0 \le z \le 0.5$. The disclosed compositions may also have the formula $Li_{(3-x)}N_{x/3}OA$, wherein N is a trivalent metal, wherein A is a halide, and wherein $0 \le x \le 3$, or even where $0 \le x \le 0.9$.

It should also be understood that the expression $P \le Q$ means that P can be equal to Q or that P can be greater than Q. It should also be understood that the expression $P \le Q$ may, in some embodiments, mean that Q is necessarily greater than P and is not ever equal to P. As one example, $0 < x < 3$, $0 \le x \le 3$, $0 \le x < 3$, and $0 < x \le 3$ may all be suitable subscript ranges for certain materials disclosed herein.

Without being bound to any particular theory, in the disclosed compositions, Li occupies the vertices of octahedra (arranged in a cubic array) with an oxygen atom at the octahedra centers. Halogens occupy the spaces between the octahedra. Doping with di- or trivalent cations (e.g., metals) introduces vacancies in the material, which further enhances ionic transport: e.g., $Li_{(3-2x)}M_{x/2}OX$, where M is a divalent metal. Using mixtures of halogens, e.g., $Li_3OX_zY_{(1-z)}$, where X and Y are halogens, permits a controlled distortion of the perovskite structure, which under some circumstances reduces hopping barriers and provides easier paths for ionic transport. An exemplary synthesis method was developed based on the use of LiOH and LiCl, both of which are currently fabricated cheaply and in large quantities in the United States. The disclosed methods are also suitable for convenient scale-up. In contact with water, the materials may decompose to LiOH and LiCl, such that the material can be recycled. When thus recycled, it presents minimal environmental hazards.

The present disclosure also provides electrochemical devices that comprise a solid electrolyte composition of the formula $Li_3OCl$, of the formula $Li_{(3-x)}M_{x/2}OA$ (e.g., $0 \le x \le 2$, suitably), or even $Li_{(3-x)}N_{x/3}OA$ (e.g., $0 \le x \le 3$), wherein M comprises or is selected from the group consisting of magnesium, calcium, barium, strontium, and mixtures thereof, wherein A comprises or is selected from the group consisting of fluoride, chloride, bromide, iodide, and mixtures thereof, and wherein N is a trivalent metal. Examples of electrochemical devices include, but are not limited to, a battery and a capacitor. A device may also include a composition having the formula $Li_3OX_zY_{(1-z)}$, in which X and Y are halogens, and wherein, e.g., $0 \le z \le 1$. As explained elsewhere herein, a composition according to the present disclosure may feature one or more cationic (e.g., metal) dopants as and two or more types of halide.

It should be understood that a device according to the present disclosure may include the disclosed compositions in any number of forms, e.g., as a film, as a trace, or as another suitable structure. The disclosed materials may be disposed (e.g., via spin coating, pulsed laser deposition, lithography, or other deposition methods known to those of ordinary skill in the art) to a substrate or other part of a device. Masking, stencils, and other physical or chemical deposition techniques may be used so as to give rise to a structure having a particular shape or configuration.

The thickness of a film or feature used in a device may be, e.g., in the range of from about 0.1 micrometers to about 20 micrometers or even about 1000 micrometers. Films and other features having a thickness in the range of from about 10 micrometers to about 20 micrometers are considered particularly suitable, but features having other thicknesses may also be used. A device (e.g., a battery) according to the present disclosure may, for example, include a cathode, anode, electrolyte. A protective layer may also be used to shield or otherwise protect any components of the device, including the electrolyte. Suitable substrates include insulating substrates, semiconducting substrates, and even conductive substrates. Suitable substrate materials (e.g., $SiO_2$) for the foregoing will be known to those of ordinary skill in the art.

The present disclosure also provides a solid electrolyte composition having the formula $Li_{(3-x)}N_{x/3}OA$, wherein, e.g., 0≤x≤3 or even 0≤x≤0.9 in some embodiments, wherein N is a cation $Q^{+3}$, and wherein A is a halide, e.g., comprising or being selected from the group consisting of fluoride, chloride, bromide, iodide, or a mixture thereof.

The present disclosure also provides methods. These methods include heating in a vessel (suitably under dry, water-free, or essentially water-free conditions) an admixture of lithium hydroxide (suitably in powder form) and a lithium halide (suitably in powdered form), the heating being performed so as to convert at least a portion of the admixture to a melt composition; and cooling that melt composition so as to give rise to an product composition.

BRIEF DESCRIPTION OF THE DRAWINGS

The summary, as well as the following detailed description, is further understood when read in conjunction with the appended drawings. For the purpose of illustrating the disclosed technology, there are shown in the drawings exemplary embodiments; however, the disclosure is not limited to the specific methods, compositions, and devices disclosed. In addition, the drawings are not necessarily drawn to scale or proportion. In the drawings.

DETAILED DESCRIPTION OF ILLUSTRATIVE EMBODIMENTS

The present disclosure may be understood more readily by reference to the following detailed description taken in connection with the accompanying figures and examples, which form a part of this disclosure. It is to be understood that this disclosure is not limited to the specific devices, methods, applications, conditions or parameters described and/or shown herein, and that the terminology used herein is for the purpose of describing particular embodiments by way of example only and is not intended to be limiting of the claims. Also, as used in the specification including the appended claims, the singular forms "a," "an," and "the" include the plural, and reference to a particular numerical value includes at least that particular value, unless the context clearly dictates otherwise. The term "plurality," as used herein, means more than one. When a range of values is expressed, another embodiment includes from the one particular value and/or to the other particular value. Similarly, when values are expressed as approximations, by use of the antecedent "approximately" or "about," it will be understood that the particular value forms another embodiment. All ranges are inclusive and combinable, and all documents cited herein are incorporated by reference in their entireties for any and all purposes.

It is to be appreciated that certain features of the disclosure which are, for clarity, described herein in the context of separate embodiments, may also be provided in combination in a single embodiment. Conversely, various features of the invention that are, for brevity, described in the context of a single embodiment, may also be provided separately or in any subcombination. Further, reference to values stated in ranges include each and every value within that range.

In one aspect, the present disclosure provides solid electrolytes that are anti-perovskites, e.g., the formula $Li_3OCl$. Some embodiments of these solid electrolytes have the general formula $Li_{(3-x)}M_{(x/2)}OA$, wherein M is an alkaline earth cation, e.g., comprising or being selected from $Mg^{2+}$, $Ca^{2+}$, $Ba^{2+}$, $Sr^{2+}$, and combinations thereof, and A is one or more halide anions, e.g., comprising or being selected from fluoride, chloride, bromide, iodide, and combinations thereof. Electrolytes may also include a ternary metal N, and may have the formula $Li_{(3-x)}M_{(x/3)}OA$ The value of x in the formulas is, e.g., suitably 0≤x≤3, or suitably 0<x≤0.8. Some non-limiting values of x include, 0.10, 0.15, 0.20, 0.25, 0.30, 0.35, 0.40, 0.45, 0.50, 0.55, 0.60, 0.65, 0.70, and 0.80; x may also have a value smaller than 0.10. As one non-limiting example, some values of x that are less than 0.10 include 0.01, 0.02, 0.03, 0.04, 0.05, 0.06, 0.07, 0.08, and 0.09.

For each of these values of x, M is suitably an alkaline earth cation, or a mixture of alkaline earth cations, and A is a halide or mixture of halides. For example, A can be a mixture of chloride and bromide. A can be a mixture of chloride and fluoride. A can be a mixture of fluoride and chloride. A can be a mixture of chloride and bromide and iodide. It should be understood that A can be a mixture of halides, e.g., two, three, or even four halides.

The term "anti-perovskite" may be understood in relation to an explanation of what a normal perovskite is. A normal perovskite may have a composition of the formula $ABX_3$ wherein A is a cation $A^+$, B is a cation $B^{2+}$ and X is an anion $X^-$. A normal perovskite may also be a composition of the formula $ABX_3$ wherein A is a cation $A^{+3}$, B is a cation $B^{+3}$, and X is an anion $X^{-2}$. A normal perovskite has a perovskite crystal structure, which is a well-known crystal structure.

An antiperovskite composition also has the formula $ABX_3$, but in contrast to a normal perovskite, A and B in an antiperovskite are the anions and X is the cation. For example, the antiperovskite $ABX_3$ having the chemical formula $ClOLi_3$ has a perovskite crystal structure but the A (i.e., Cl) is an anion, the B ($O^2$) is an anion, and X (i.e. $Li^+$ is a cation. $ClOLi_3$ can be rewritten as $Li_3OCl$. $Li_3OCl$ is an especially suitable antiperovskite.

Suitable disclosed solid electrolyte antiperovskite compositions may also have the chemical formula $Li_{(3-x)}M_{x/2}OA$.

Suitably antiperovskite compositions may also be of the formula $Li_{(3-x)}N_{x/3}OA$ wherein N is a cation with a +3 charge (e.g. $Al^{+3}$), A is halide (e.g., $F^-$, $Cl^-$, $Br^-$, $I^-$, and mixtures thereof), and $0 \leq x < 0.90$.

Both $Li_3OCl$ and $Li_{2.8}Mg_{0.1}OCl$ are antiperovskites. The latter can be thought of relative to the former as having some of the sites that would have been occupied with $Li^+$ now being replaced with the higher valence cation $Mg^{2+}$. This replacement introduces vacancies in the anti-perovskite crystal lattice. Without being bound to any particular theory, it is believed that replacement of 2 $Li^+$ with a $Mg^{2+}$ introduces a vacancy in the antiperovskite crystal lattice. Impedance measurements show that $Li_{2.8}Mg_{0.1}OCl$ (an exemplary composition) has a substantially higher ionic conductivity than $Li_3OCl$. It is believed that the creation of these vacancies by replacement a magnesium cation for two lithium cations, thus maintaining the charge balance, is responsible for the improved ionic conductivity of $Li_{2.8}Mg_{0.2}OCl$ relative to $Li_3OCl$. It is believed that these vacancies facilitate $Li^+$ hopping in the lattice.

Antiperovskite solid electrolytes according to the present disclosure may be prepared by, e.g., subjecting a mixture (which may be homogeneous) of various solid precursors to elevated pressures and temperatures. This method may be referred to as a sintering method. This sintering method is useful to prepare anhydrous antiperovskite electrolytes of the formula $Li_{3-x}M_{x/2}OA$ wherein M is an alkaline earth cation ($Mg^{2+}$, for example), and wherein A is a halide or a mixture of halides, and wherein $0 \leq x \leq 3$.

For example, an exemplary antiperovskite solid electrolyte may be prepared by mechanically mixing precursor powders of lithium oxide ($Li_2O$), calcium oxide (CaO) and lithium halide (e.g., LiCl), ball-milling the powders under a dry argon atmosphere to form a homogeneous mixture, and subjecting the ball-milled mixture to elevated pressures and temperatures. In other embodiments of the sintering method, precursor powders of $Li_2O$, MgO, and lithium halides (LiF, LiCl, and/or LiBr) were mechanically mixed and then subjected to ball-milling under a dry argon atmosphere to form a homogeneous powder mixture. The homogeneous powders were sent to the National Synchrotron Light Source at Brookhaven National Laboratory.

The sintering method was monitored by in-situ and real-time synchrotron x-ray diffraction using a cubic-anvil apparatus at Beamline X17B2 of the National Synchrotron Light Source at Brookhaven National Laboratory. An energy-dispersive x-ray method was employed with diffracted x-rays collected at a fixed Bragg angle of $2\theta=6.5°$. The pressure was determined using a reference standard of NaCl and the temperature was measured using a W/Re25%-W/Re3% thermocouple. The uncertainty in pressure measurements is mainly attributed to statistical variation in the position of diffraction lines of NaCl and was typically less than 2% of the cited values. The temperature variations over the entire length of sample container at 1500 K were of the order of 20 K, and the radial temperature gradients were less than 20 K at this condition. X-ray diffraction patterns were obtained for the reference NaCl and for the sample in close proximity to the thermocouple junction. The uncertainties in temperature measurements were thus estimated to be approximately $\pm 10°$ C.

The following examples (Examples D-J, below) present illustrative, non-limiting examples of antiperovskite electrolytes prepared by subjecting a homogeneous mixture of powder precursors to elevated temperatures and pressures. High purity powders the precursors $Li_2O$ (98% pure) and LiCl (99% pure) or LiBr (99% pure) were obtained from Acros, and CaO (>99% pure) was obtained from Fisher. Table 1 below summarizes the formula of the antiperovskite, the formulas of the precursors, their weights in grams, and the molar ratio of the precursors.

TABLE 1

| Example | Formula | Precursors (wt in grams) | Molar ratio |
|---|---|---|---|
| D | $Li_3OCl$ | $Li_2O$ (0.413), LiCl (0.587) | $Li_2O$:LiCl = 1:1 |
| E | $Li_{2.90}Ca_{0.05}OCl$ | $Li_2O$ (0.386), CaO (0.576), LiCl (0.576) | $Li_2O$:CaO:LiCl = 0.95:0.05:1 |
| F | $Li_{2.8}Ca_{0.1}OCl$ | $Li_2O$ (0.359), CaO (0.075), LiCl (0.566) | $Li_2O$:CaO:LiCl = 0.90:0.1:1 |
| G | $Li_{2.8}Mg_{0.1}OCl$ | $Li_2O$ (0.386), MgO (0.0576), LiCl (0.636) | $Li_2O$:MgO:LiCl = 0.90:0.10:1.00 |
| H | $Li_{2.6}Mg_{0.2}OCl$ | Li2O (0.359), MgO (0.121) LiCl (0.636) | $Li_2O$:MgO:LiCl = 0.80:0.20:1.00 |
| I | $Li_3OBr$ | $Li_2O$ (0.512), LiBr (1.483) | $Li_2O$:LiBr = 1:1 |
| J | $Li_3OBr_{0.5}Cl_{0.5}$ | $Li_2O$ (0.381), LiCl (0.270), LiBr (0.552) | $Li_2O$: LiCl:LiBr = 1:0.5:0.5 |

Example D

For EXAMPLE D, an amount of 0.413 grams $Li_2O$, and amount of 0.587 grams of LiCl, which corresponds to a molar ratio of $Li_2O$:LiCl of 1:1, were mixed in a glove box under a dry argon atmosphere. The mixture was then ground by ball milling for 2 hours inside the glove box using a SPEX SAMPLE PREP, 5100 MIXER MILL in a stainless steel crucible and under the dry argon atmosphere. The ball milled powder was then enclosed inside a container with its cap sealed using high-performance SCOTCH TAPE®. The bottle and powder inside were shipped to National Synchrotron Light Source at Brookhaven National Laboratory where the container was taken into a glove box under a dry argon atmosphere. The cap was unsealed and the powder was loaded into a high pressure cell that consisted of a cubic mixture of amorphous boron and epoxy resin ("BE"), an amorphous carbon cylinder as a heating element, a cylindrical alumina sleeve that separated the BE from the carbon cylinder, and a hexagonal boron nitride ("BN") sample container of 1 millimeter inner diameter and 2 millimeter length. The powder mixture and the NaCl powder were packed into the BN container, with a thin disk of BN separating the starting powder sample mixture from the NaCl powder. This BN disk prevented the powder mixture from interacting with the NaCl powder (i.e. the pressure standard). The volume ratio for the two powders was approximately 1:1. After the pressure cell was completely assembled, all air pathways on the pressure cell were covered by DUCO® cement to isolate the powders from moisture. Before removing the assembly from the glove box, the resulting as-finished pressure cell was placed into a capped plastic tube with both ends sealed by high-performance electrical tape. The pressure cell was removed from the plastic tube, placed into a cubic anvil module inside a hydraulic press, and rapidly pumped up to a pressure of about 0.1 GPa sample pressure. Typically, it took 10-15 minutes to set up the anvil pressure module into the hydraulic press and then pump the oil pressure up so as to reach a sample pressure condition of approximately 0.1 GPa by squeezing the cubic sample assembly with six synchronized 5 anvils. It was believed that these steps isolated the sample contents of the pressure cell from room air. After synchrotron x-ray diffraction data were collected at two different sample positions under ambient conditions for calibration purposes, the sample and NaCl pressure standard were compressed to 0.54 GPa and then heated in a stepwise fashion from 27° C. to 279° C. The synchrotron x-ray diffraction were collected for both the sample 1 o and the NaCl along a heating path at temperatures of 27° C., 102° C., 152° C., 182° C., 201° C., 225° C., 250° C., and 279° C. The experiment was ended by cooling to room temperature, followed by decompression to ambient conditions. Diffraction data were collected on the recovered sample.

Example E

EXAMPLE E was prepared by combining an amount of 0.386 grams $Li_2O$, an amount of 0.576 grams CaO, and amount of 0.576 grams of LiCl, which corresponds to a molar ratio of $Li_2O$:CaO:LiCl of 0.95:0.05:1, were mixed in a glove box under an argon atmosphere. The mixture was then grinded by ball milling for 2 hours inside the glove box using a SPEX SAMPLE PREP, 5100 MIXER MILL in a stainless steel crucible and under the dry argon atmosphere. The ball milled powder was then enclosed inside a container with its cap sealed using high-performance SCOTCH TAPE®. The bottle and powder inside were shipped to National Synchrotron Light Source at Brookhaven National Laboratory where the container was taken into a glove box under a dry argon atmosphere. The cap was unsealed and the powder was loaded into a high pressure cell that consisted of a cubic mixture of amorphous boron and epoxy resin ("BE"), an amorphous carbon cylinder as a heating element, a cylindrical alumina sleeve that separated the BE from the carbon cylinder, and a hexagonal boron nitride ("BN") sample container of 1 millimeter inner diameter and 2 millimeter length. The powder mixture and the NaCl powder were packed into the BN container, with a thin disk of BN separating the starting powder sample mixture from the NaCl powder. This BN disk prevented the powder mixture from interacting with the NaCl powder (i.e. the pressure standard). The volume ratio for the two powders was approximately 1:1.

After the pressure cell was completely assembled, all air pathways on the pressure cell were covered by DUCO® cement to isolate the powders from moisture. Before removing the assembly from the glove box, the resulting as-finished pressure cell was placed into a capped plastic tube with both ends sealed by high-performance electrical tape. The pressure cell was removed from the plastic tube, placed into a cubic anvil module inside a hydraulic press, and rapidly pumped up to a pressure of about 0.1 GPa sample pressure. Typically, it took 10-15 minutes to set up the anvil pressure module into the hydraulic press and then pump the oil pressure up so as to reach a sample pressure condition of approximately 0.1 GPa by squeezing the cubic sample assembly with six synchronized anvils. It was believed that these steps isolated the sample contents of the pressure cell from room air.

After synchrotron x-ray data were collected at two different sample positions under these ambient conditions, the sample and NaCl were compressed to 0.41 GPa and then heated in a stepwise fashion from 27° C. to 250° C. Synchrotron x-ray diffraction data were collected for both the sample and the NaCl along the heating path at temperatures of 27° C., 100° C., 150° C., 195° C., 215° C., 227° C., and 250° C. The experiment ended by cooling to room temperature and then decompression to ambient conditions. Afterward, diffraction data were collected on the recovered sample at three different sample conditions.

Example F

EXAMPLE F was prepared by combining an amount of 0.359 grams $Li_2O$, an amount of 0.075 grams of CaO, and amount of 0.566 grams of LiCl, which corresponds to a molar ratio of $Li_2O$:CaO:LiCl of 0.90:0.1:1, were mixed in a glove box under a dry argon atmosphere. The mixture was then grinded by ball milling for 2 hours inside the glove box using a SPEX SAMPLE PREP, 5100 MIXER MILL in a stainless steel crucible and under the dry argon atmosphere. The ball milled powder was then enclosed inside a container with its cap sealed using high-performance SCOTCH TAPE®. The bottle and powder inside were shipped to National Synchrotron Light Source at Brookhaven National Laboratory where the container was taken into a glove box under a dry argon atmosphere. The cap was unsealed and the powder was loaded into a high pressure cell that consisted of a cubic mixture of amorphous boron and epoxy resin ("BE"), an amorphous carbon cylinder as a heating element, a cylindrical alumina sleeve that separated the BE from the carbon cylinder, and a hexagonal boron nitride ("BN") sample container of 1 millimeter inner diameter and 2 millimeter length. The powder mixture and the NaCl powder were packed into the BN container, with a thin disk of BN separating the starting powder sample mixture from the NaCl powder. This BN disk prevented the powder mixture from interacting with the NaCl powder (i.e. the pressure standard). The volume ratio for the two powders was approximately 1:1.

After the pressure cell was completely assembled, all air pathways on the pressure cell were covered by DUCO® cement to isolate the powders from moisture. Before removing the assembly from the glove box, the resulting as-finished pressure cell was placed into a capped plastic tube with both ends sealed by high-performance electrical tape. The pressure cell was removed from the plastic tube, placed into a cubic anvil module inside a hydraulic press, and rapidly pumped up to a pressure of about 0.1 GPa sample pressure. Typically, it took 10-15 minutes to set up the anvil pressure module into the hydraulic press and then pump the oil pressure up so as to reach a sample pressure condition of approximately 0.1 GPa by squeezing the cubic sample assembly with six synchronized anvils. It was believed that these steps isolated the sample contents of the pressure cell from room air. After synchrotron x-ray diffraction data were collected at two different sample positions, the sample and NaCl were compressed to 0.36 GPa and then heated in a stepwise fashion from a temperature of 27° C. to 250° C. Synchrotron x-ray diffraction data were collected for both the sample and the NaCl along the heating path at temperatures of 27° C., 75° C., 100° C., 125° C., 150° C., 170° C., 180° C., 190° C., 200° C., 212° C., 220° C., 223° C., and 250° C. The experiment was ended by cooling to room temperature and then decompression to ambient conditions. Afterward, diffraction data were collected on the recovered sample at two different sample conditions.

Example G

An amount of 0.386 grams $Li_2O$, an amount of 0.576 grams MgO, and an amount of 0.608 grams of LiCl, which corresponds to a molar ratio of Li20:MgO:LiCl of 0.90:0.10:1.00 were mixed in a glove box under an argon atmosphere. The mixture was then grinded by ball-milling for 2 hours inside the glove box using a SPEX SAMPLE PREP, 5100 MIXER MILL in a stainless steel crucible and under the dry argon atmosphere. The ball milled powder was then enclosed inside a container with its cap sealed using high-performance SCOTCH TAPE®. The bottle and powder inside were shipped to National Synchrotron Light Source at Brookhaven National Laboratory where the container was taken into a glove box under a dry argon atmosphere. The cap was unsealed and the powder was loaded into a high pressure cell that consisted of a cubic mixture of amorphous boron and epoxy resin ("BE"), an amorphous carbon cylinder as a heating element, a cylindrical alumina sleeve that separated the BE from the carbon cylinder, and a hexagonal boron nitride ("BN") sample container of 1 millimeter inner diameter and 2 millimeter length. The powder mixture and the NaCl powder were packed into the BN container, with a thin disk of BN separating the starting powder sample mixture from the NaCl powder. This BN disk prevented the powder mixture from interacting with the NaCl powder (i.e. the pressure standard). The volume ratio for the two powders was approximately 1:1.

After the pressure cell was completely assembled, all air pathways on the pressure cell were covered by DUCO® cement to isolate the powders from moisture. Before removing the assembly from the glove box, the resulting as-finished pressure cell was placed into a capped plastic tube with both ends sealed by high-performance electrical tape. The pressure cell was removed from the plastic tube, placed into a cubic anvil module inside a hydraulic press, and rapidly pumped up to a pressure of about 0.1 GPa sample pressure. Typically, it took 10-15 minutes to set up the anvil pressure module into the hydraulic press and then pump the oil pressure up so as to reach a sample pressure condition of approximately 0.1 GPa by squeezing the cubic sample assembly with six synchronized anvils. It was believed that these steps isolated the sample contents of the pressure cell from room air. After synchrotron x-ray data were collected at two different sample positions under these ambient conditions, the sample and NaCl were compressed to 0.41 GPa and then heated in a stepwise fashion from 27° C. to 250° C. Synchrotron x-ray diffraction data were collected for both the sample and the NaCl along the heating path at temperatures of 27° C., 100° C., 150° C., 170° C., 195° C., 215° C., 227°, and 250° C. The experiment was ended by cooling to room temperature and then decompression to ambient conditions. Afterward, diffraction data were collected on the recovered sample at three different sample conditions.

Example H

An amount of 0.359 grams $Li_2O$, an amount of 0.121 grams MgO, and an amount of 0.636 grams of LiCl, which corresponds to a molar ratio of Li2O:MgO:LiCl of 0.80:0.20:1.00, were mixed in a glove box under a dry argon atmosphere. The mixture was then grinded by ball-milling for 2 hours inside the glove box using a SPEX SAMPLE PREP, 5100 MIXER MILL in a stainless steel crucible and under the dry argon atmosphere. The ball milled powder was then enclosed inside a container with its cap sealed using high-performance SCOTCH TAPE®. The bottle and powder inside were shipped to National Synchrotron Light Source at Brookhaven National Laboratory where the container was taken into a glove box under a dry argon atmosphere. The cap was unsealed and the powder was loaded into a high pressure cell that consisted of a cubic mixture of amorphous boron and epoxy resin ("BE"), an amorphous carbon cylinder as a heating element; a cylindrical alumina sleeve that separated the BE from the carbon cylinder, and a hexagonal boron nitride ("BN") sample container of 1 millimeter inner diameter and 2 millimeter length. The powder mixture and the NaCl powder were packed into the BN container, with a thin disk of BN separating the starting powder sample mixture from the NaCl powder. This BN disk prevented the powder mixture from interacting with the NaCl powder (i.e. the pressure standard). The volume ratio for the two powders was approximately 1:1.

After the pressure cell was completely assembled, all air pathways on the pressure cell were covered by DUCO® cement to isolate the powders from moisture. Before removing the assembly from the glove box, the resulting as-finished pressure cell was placed into a capped plastic tube with both ends sealed by high-performance electrical tape. The pressure cell was removed from the plastic tube, placed into a cubic anvil module inside a hydraulic press, and rapidly pumped up to a pressure of about 0.1 GPa sample pressure. Typically, it took 10-15 minutes to set up the anvil pressure module into the hydraulic press and then pump the oil pressure up so as to reach a sample pressure condition of approximately 0.1 GPa by squeezing the cubic sample assembly with six synchronized anvils. It was believed that these steps isolated the sample contents of the pressure cell from room air. After synchrotron x-ray data were collected at two different sample positions under these ambient conditions, the sample and NaCl were compressed to 0.36 GPa and then heated in a stepwise fashion from 27° C. to 250° C. Synchrotron x-ray diffraction data were collected for both powder mixture and NaCl along the heating path at 27° C., 75° C., 100° C., 125° C., 150° C., 170° C., 180° C., 190° C., 200° C., 212° C., 220° C., 223° C., and 300° C. The experiment was ended by cooling to room temperature and then decompression to ambient conditions. Diffraction data were collected on the recovered sample at three different sample conditions.

Example I

EXAMPLE I was prepared by combining an amount of 0.512 grams $Li_2O$, and amount of 1.483 grams of LiBr, which corresponds to a molar ratio of $Li_2O$:LiBr of 1:1, were mixed in a glove box under an argon atmosphere The mixture was then grinded by ball milling for 2 hours inside the glove box using a SPEX SAMPLE PREP, 5100 MIXER MILL in a stainless steel crucible and under the dry argon atmosphere. The ball milled powder was then enclosed inside a container with its cap sealed using highperformance SCOTCH TAPE®. The bottle and powder inside were shipped to National Synchrotron Light Source at Brookhaven National Laboratory.

Example J

An amount of 0.381 grams $Li_2O$, and an amount of 0.270 grams of LiCl, and an amount of 0.552 grams of LiBr, which corresponds to a molar ratio of $Li_2O$:LiCl:LiBr of 1:0.5:0.5, were mixed in a glove box under an argon atmosphere. The mixture was then grinded by ball milling for 2 hours inside the glove box using a SPEX SAMPLE PREP, 5100 MIXER MILL in a stainless steel crucible and under the dry argon atmosphere. The ball milled powder was then enclosed inside a sample bottle with its cap sealed using high-performance SCOTCH TAPE®. The bottle and powder inside were shipped to National Synchrotron Light Source at Brookhaven National Laboratory. At the National Synchrotron Light Source at Brookhaven National Laboratory, the container was taken into a glove box under a dry argon atmosphere. The cap was unsealed and the powder was loaded into a high pressure cell. The high pressure cell consisted of a cubic mixture of amorphous boron and epoxy resin ("BE"), an amorphous carbon cylinder as a heating element, a cylindrical alumina sleeve that separated the BE from the carbon cylinder, and a hexagonal boron nitride ("BN") sample container of I millimeter inner diameter and 2 millimeter length. The powder mixture and the NaCl powder were packed into the BN container, with a thin disk of BN separating the powder mixture from the NaCl powder. This BN disk prevented the powder mixture from interacting with the NaCl powder (i.e. the pressure standard). The volume ratio for the two powders was approximately 1:1.

After the pressure cell was completely assembled, all air pathways on the pressure cell were covered by DUCO® cement to isolate the powders from moisture. Before removing the assembly from the glove box, the resulting as-finished pressure cell was placed into a capped plastic tube with both ends sealed by high-performance electrical tape. The pressure cell was removed from the plastic tube, placed into a hydraulic press, and rapidly pumped up to a pressure of about 1 kilo bar sample pressure. Typically, it took 10-15 minutes to set up the anvil pressure module into the hydraulic press and then pump the oil pressure up so as to reach a sample pressure condition of approximately 0.1 GPa, by squeezing the cubic sample assembly with six synchronized anvils. It was believed that these steps isolated the sample contents of the pressure cell from room air. After synchrotron x-ray diffraction data were collected at three different sample positions under these ambient conditions, the mixture and NaCl were compressed to 1.36 GPa and then heated in a stepwise fashion from 27° C. to 300° C. Synchrotron x-ray diffraction data were collected for both powder mixture and NaCl along the heating path at 27° C., 100° C., 150° C., 175° C., 200° C., 213° C., 230° C., 250° C., 275° C., 300° C. The experiment was ended by cooling to room temperature and then decompression to ambient conditions. Diffraction data were collected on the recovered sample at five different sample conditions.

The ionic conductivity of an illustrative $Li_3OCl_{0.5}Br_{0.5}$ material was obtained from impedance match measurements. The ionic conductivity (cr) was in the range of approximately $10^{-4}$ to $10^{-3}$ S/cm at room temperature, which means that the ionic conductivity of the reaction product $Li_3OCl_{0.5}Br_{0.5}$ reached super-ionic conduction (i.e. exhibited super-ionic behavior). The ionic conductivity ($\sigma$) increased to approximately $10^{-2}$ to $10^{-1}$ S/cm as the temperature increased above 525 K indicated that the $Li_3OCl_{0.5}Br_{0.5}$, like $Li_3OCl$, exhibited super-ionic behavior. Without being bound to any particular theory, it is believed that the mixing of large (BO anions and small (Cr) anions created interstitial ionic pathways for super ionic conduction.

Although the disclosed technology has been described with reference to specific details, it is not intended that such details should be regarded as limitations upon the scope of the disclosure, except as and to the extent that they are included in the accompanying claims.

Additional Discussion

As explained elsewhere herein, lithium ion batteries show great promise in electrical energy storage with enhanced energy density, power capacity, charge-discharge rates, and cycling lifetimes. However, common fluid electrolytes consisting of lithium salts dissolved in solvents may be toxic, corrosive, or even flammable. Solid electrolytes with superionic conductivity may avoid those shortcomings and be used with a metallic lithium anode, thereby allowing comparatively high energy densities.

The present disclosure provides, inter alia, a novel class of solid electrolytes with three-dimensional conducting pathways based on lithium-rich anti-perovskites (LiRAP). The materials may, in some cases, exhibit ionic conductivity of, e.g., $\sigma > 10^{-3}$ S/cm at room temperature and an activation energy of about 0.2 eV to about 0.3 eV. As temperature approaches the melting point, the ionic conductivity of the anti-perovskites increases to advanced superionic conductivity of $\sigma > 10^{-2}$ S/cm and beyond. The new crystalline materials can be readily manipulated via chemical, electronic, and structural means to boost ionic transport and serve as high-performance solid electrolytes for superionic $Li^+$ conduction in electrochemistry applications.

The present disclosure also provides a variety of synthesis techniques useful for synthesizing the disclosed materials. For example, $Li_3OCl$ synthesis may comprise combining (e.g., mixing) together 2 equivalents of LiOH and 1 equivalent of LiCl. In an exemplary synthesis, 2.40 g of LiOH (0.1 mol; Aldrich, >99% purity) and 2.12 g of LiCl (0.05 mol; Aldrich, >99% purity) are ground together for several minutes with a mortar and pestle. The resulting paste may be placed in a quartz tube and heated to 330-360° C. (i.e., past the melting point $T_m = 282°$ C. of the product) under vacuum for a period of time, which may be several days.

During heating, water is effectively removed with a condensation (liquid nitrogen) trap and a high-vacuum pump. At the end of the reaction, the molten product in the quartz tube may be rapidly cooled (e.g., quenched) or slowly cooled to room temperature, which results in different textures and grain boundary morphologies. At the end of the synthesis, the apparatus is flushed with a dry inert gas (e.g., Ar, $N_2$, and the like) and the hygroscopic sample remains unexposed to atmospheric moisture. Continuous heating (330-360° C. at melt) and removal of water under high vacuum may be used to drive the chemical equilibrium toward the formation of the $Li_3OCl$ product:

$$LiCl + 2LiOH \rightarrow Li_3OCl + H_2O \tag{1}$$

The reaction in the molten state is simple, and the sample is obtained as a white, dense, hard polycrystalline mass. High-P/high-T synthesis from $Li_2O$ and LiCl were also performed and obtained the same polycrystalline anti-perovskite samples through a different reaction path. Without being bound to any particular theory, pressing on the reagent mixture may push the diffusion-limited solid state reaction to completion by maintaining contact between reagents. The high-P/-T synthesis is favored thermodynamically for such solid state reactions as well. The molten synthesis approach is novel and can be scaled up easily to produce large quantities of product.

Anti-perovskites may be structurally manipulated by chemical substitution, e.g. by introducing comparatively large $Br^-$ anions at the dodecahedral site to replace $Cl^-$ anions. The use of mixed halogens (e.g., $Cl_{1-z}Br_z$) can drive the tolerance factor: $t = (r_A + r_X)/[\sqrt{2}(r_B + r_X)]$ of the anti-perovskite to vary from 0.85 for pure $Li_3OCl$ to 0.91 for pure $Li_3OBr$ as the substitution goes from the chlorine end-member to the bromine end-member. A higher tolerance factor indicates that the anti-perovskite structure approaches a less distorted pseudocubic phase. This, in turn, promotes the displacive structural phase transition controlled by phonon softening. The eutectic effect also reduces the melting and phase transition temperatures in the antiperovskite with mixed halogens. Without being bound to any particular theory, such structural manipulations should promote superionic conduction via Frenkel interstitial transport.

Figure 1:
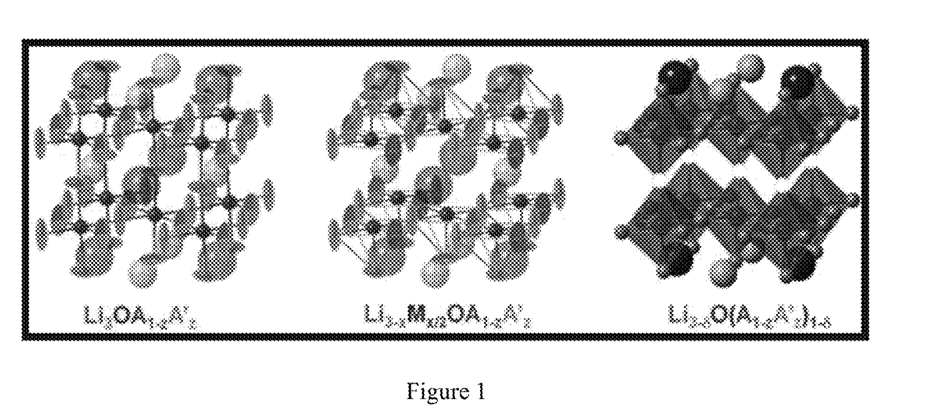
FIG. 1. Anti-perovskite structure drawings to illustrate the effects of mixing (left), doping (mid), and depletion (right). The comparatively large thermal ellipsoids demonstrate the soft phonon effects and are drawn at 68% probability level.

In general, mixed-halogen compositions of Li-rich antiperovskites can be obtained easily with simple modifications of the synthesis described above, e.g. $Li_3OA_{1-z}A'_z$ where A and A' are distinct A-site halogens (e.g., F, Cl, Br, I) can be prepared as, FIG. 1 (left):

$$2LiOH + (1-z)LiA + zLiA' \rightarrow Li_3OA_{1-z}A'_z + H_2O \tag{2}$$

Similarly, cationic doping is easily achieved, as shown in reaction 3:

$$2LiOH + (x/2)MA_2 + (1-x)LiA \rightarrow Li_{3-x}M_{x/2}OA + H_2O \tag{3}$$

where A is a halogen at the dodecahedral site and M is a divalent metal (e.g., an alkaline earth element such as $Mg^{2+}$) replacement at the <$Li_6O$> octahedral center. This reaction may also be applied with little to no modification to higher-valent metals. This in turn produces a material having increased concentration of electronic vacancies at the Li sites in the anti-perovskite lattice so as to promote neighboring ionic hopping via the Schottky route, and presents a doping method to increase ionic conductivity in ionic solids. Without being bound to any particular theory, one way to conceptualize the approach is to configure an anti-perovskite structure with comparatively fast ionic channels in which the vacant Li sites line up in a more or less ordered fashion, e.g., FIG. 1 (middle).

One may combine the synthesis reactions 2 and 3 to produce materials with more general anti-perovskite compositions: $Li_{3-x}M_{x/2}OA_{1-z}A'_z$. The charge and size of M, A, and A' permit the manipulation of the anti-perovskite crystal lattice and electronic structure. The resulting "vacancy-enhanced" and "distortion-controlled" solid electrolyte materials represent a vast family of Li-rich anti-perovskites with excellent and easily-manipulated Li+ ionic conductivity.

One may also deplete LiA to effectively introduce empty dodecahedral A-sites and Li vacancies at the octahedral vertex, FIG. 1 (right), so as to control the structural distortion and produce lattice defects/channels for enhanced ionic conduction in the anti-perovskites. The depleted samples of $Li_{2.95}OCl_{0.95}$, $Li_{2.90}OCl_{0.90}$, $Li_{2.85}OCl_{0.85}$, and $Li_{2.80}OCl0.80$, i.e. [$Li_3OCl$–(0.05, 0.10, 0.15, 0.20)×(LiCl)], were synthesized to generate the 5%, 10%, 15%, and 20% Cl depletion (empty A-sites) in the anti-perovskite with concurrent creation of 1.66%, 3.33%, 5%, and 6.66% Li vacancies (0.05/3, 0.10/3, 0.15/3, 0.20/3) due to the electronic balance rule. The molten synthesis of the "depleted" anti-perovskites is similar to above listed reactions:

$$(1-\delta)LiA + 2LiOH \rightarrow Li_{3-\delta}OA_{1-\delta} + H_2O \quad (4)$$

By integrating reactions 2, 3, and 4, even more general antiperovskite compositions can be readily derived as $Li_{3-x-\delta}M_{x/2}O(A_{1-z}A'_z)_{1-\delta}$, which combines the effects of A-mixing, M-doping, and LiA-depletion to further control structural distortion and enhance $Li^+$ hopping for optimized lithium transport. The extent of mixing, doping, and depleting can be substantial, and may evolve anti-perovskite structures that remain stable. One may conceptualize the Li-rich anti-perovskites as a "lithium swamp" that require "trenches" to channel fast ionic transport. The combined manipulation via chemical, electronic, and structural means forms such three-dimensional (3D) "channels" to allow for easy $Li^+$ hopping and transport.

Figure 2:
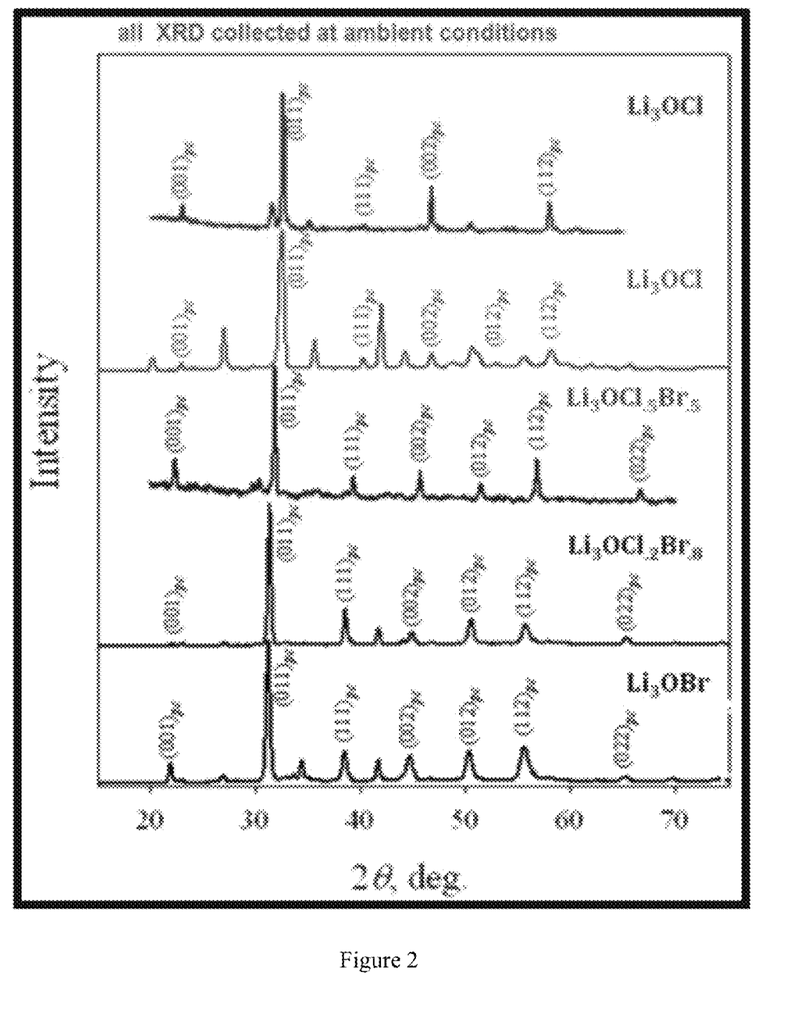
FIG. 2. X-ray diffraction patterns of $Li_3OCl$, $Li_3OBr$, and mixed $Li_3O(Cl,Br)$ anti-perovskites collected at room temperature. The major diffraction peaks are indexed with Miller indices for the pseudocubic perovskite structure. The two diffraction patterns with limited 2θ range are data collected with samples made via the high-temperature melting process. The other diffraction patterns are data collected with the samples synthesized via the high-pressure/-temperature route.

Without being bound to any particular theory, the soft phonon-driven structural phase transitions in the anti-perovskites can actively promote lithium transport. The associated large thermal ellipsoid suggests high $Li^+$ mobility, as shown in the ORTEP drawing, FIG. 1 (left and middle). The lithium thermal motion in the anti-perovskite structure occurs within a flattened thermal ellipsoid path, i.e. in a shallow and flat energy well, as happens in the "sub-lattice melting" state in the classic α-AgI case, near the structural phase transition. Such high mobility of the lithium cations in the octahedral structure allows superionic conduction in the anti-perovskite lattice at high temperatures. X-ray diffraction (XRD, Rigaku Ultima III instrument) reveals that $Li_3OCl$ and $Li_3OBr$ have the typical perovskite crystal structure, FIG. 2, albeit with minor distortions from the ideal cubic structure (#221, Pm3m) typical of perovskites. The XRD patterns in FIG. 2 are indexed with Miller indices corresponding to the pseudocubic structure. The lattice parameters are 3.91 Å and 4.02 Å for $Li_3OCl$ and $Li_3OBr$, respectively, with one formula unit per unit cell (Z=1) for a typical cubic structure. The mixed phases of the $Li_3O(Cl_{1-z}Br_z)$ anti-perovskite show a good solid-solution of two end members. Most samples, especially near room temperature, exhibit small extra Bragg peaks in their X-ray diffraction pattern. These are due to small tetragonal or orthorhombic distortions from the ideal cubic structure. These distortions are typical of many perovskites. The observed distortion is somewhat dependent on the rate of sample cooling at the end of the synthesis. At high temperature, at least some of these small extra Bragg peaks disappear as the structure (statically or dynamically) is closer on average to the ideal cubic structure. As is known, the crystallography of perovskites at the level of local disorder can be complex. It should also be noted that the samples tend to be textured, as reflected in varying relative Bragg peak intensities for samples with identical compositions. Texture may depend on the cooling rates or other parameters at the end of the synthesis.

Figure 3:
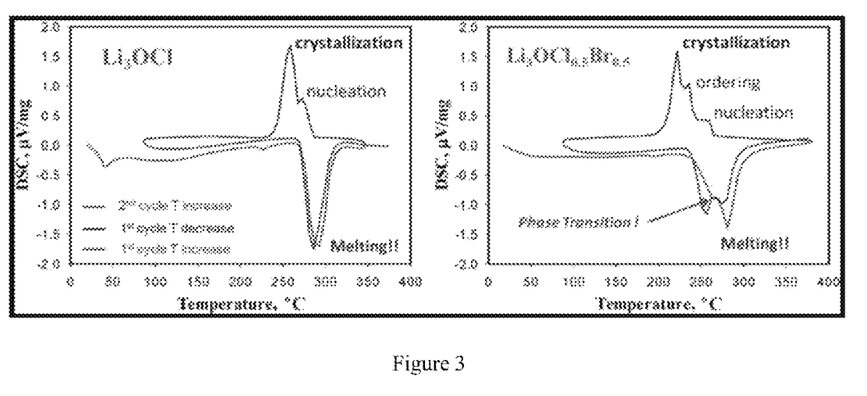
FIG. 3. Differential Scanning calorimetry (DSC) data collected at a heating rate of 5° C. $min^{-1}$ in a flow of dry argon gas; other inert materials (e.g., noble gases) may also be used. The observed thermodynamic events (phase transition, melting, nucleation, ordering, crystallization) are marked next to the DSC curve.

Structural changes (including melting) in anti-perovskites were observed with a simple thermal analysis approach. Differential scanning calorimetry (DSC, Netzsch, Jupiter 449C) measurements were performed on the anti-perovskite samples. The results are shown in FIG. 3. The last peak at high temperature (heating) is the melting phase transition. The mixed-halogen compound has a lower melting point than the two parent end members. There is a small endothermic peak in the $Li_3OCl$ sample around 40° C. and another even smaller one at around 225° C. during heating.

Again without being bound to any particular theory, in some perovskites, this may be due to a change in local order, e.g., octahedral tilting along one particular lattice axial direction. It may correspond to the unfolding of either the M3 point and/or the $R_{25}$ point of the Brillouin zone in lattice dynamics. XRD does not reveal anything remarkable at temperatures below or above these peaks other than slight changes in the intensity of the superlattice peaks, which confirms that the appearance of small, extra Bragg peaks in the diffraction pattern is related to modest structural changes resulting in tetragonal or orthorhombic distortion of the structure. Melting occurs at 282° C. for the $Li_3OCl$ sample, but the onset of melting occurs some 10 degrees lower, FIG. 3 (left). The $Li_3OBr$ sample displays the same weak endothermic feature as $Li_3OCl$, but at 206° C. A new endothermic peak appears at 232° C., below $T_m$=280° C., which represents the soft phonon-driven structural phase transition in the anti-perovskite.

The mixed halogens sample $Li_3OCl_{0.5}Br_{0.5}$ inherits this new feature of $Li_3OBr$ with a peak at 247° C. and with a lower melting point of 270° C., FIG. 3 (right). The DSC measurements of the sample $Li_3OCl_{0.5}Br_{0.5}$ during sample cooling shows three exothermic peaks, which correspond to nucleation of crystallites, ordering of the mixed halogens, and crystallization to the solid state. There are only two exothermic peaks (nucleation and crystallization) for the end member samples. As the halogens possess widely different ionic sizes, the substitution of halogens in the Li-rich anti-perovskites may, without being bound to any particular theory, be a very efficient method of structural manipulation.

Three impedance measurements at high temperatures are presented in Nyquist plots (FIG. 4) of the real and imaginary components of the impedance Z for the electrochemical circuit. Without being bound to any particular theory, an arc in the complex impedance plane demonstrates that the anti-perovskites behave as an electrolyte resistance in parallel with an inter-electrode capacitance. One may also collect relaxation spectra to show the frequency response of the electric resistances varying with temperature. The bulk ionic conductivity of the anti-perovskites may be quantified as a function of temperature, independent of electrochemical effects at electrodes.

Exemplary measurements of ionic conductivity at room temperature derive the values of $0.85 \times 10^{-3}$ S/cm for the end member $Li_3OCl$ anti-perovskite and $1.94 \times 10^{-3}$ S/cm for the 50/50 mixed phase of $Li_3OCl_{0.5}Br_{0.5}$ anti-perovskite, respectively. These values rise to $4.82 \times 10^{-3}$ S/cm and $6.05 \times 10^{-3}$ S/cm as temperature increases to T=250° C.

Figure 5:
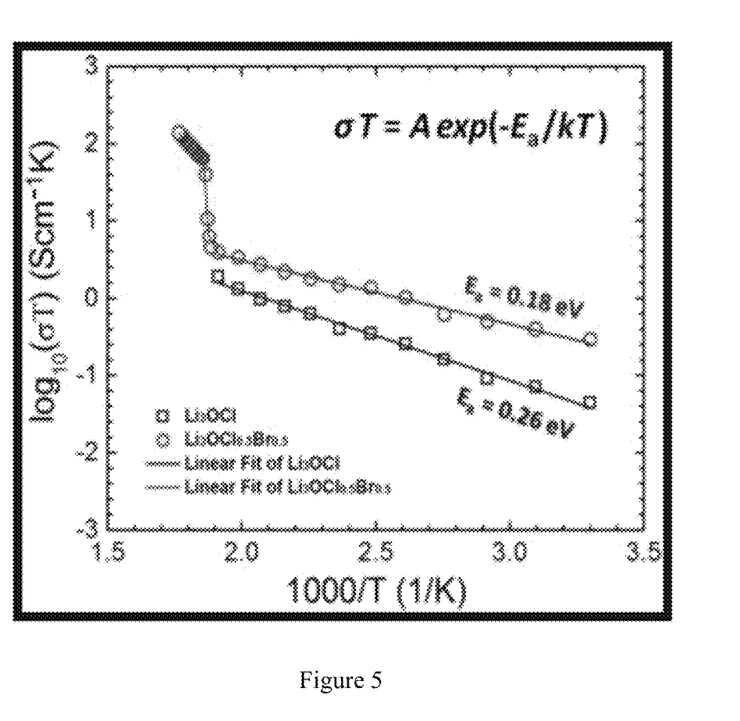
FIG. 5. Arrhenius plots of log(σT) versus 1/T for $Li_3OCl$ and $Li_3OCl_{0.5}Br_{0.5}$ anti-perovskites. The plot slopes are used to derive the activation energies $E_a$.

The ionic conductivity measurements of the Li-rich anti-perovskites at high temperatures follow the typical Arrhenius plots, FIG. 5, which reflects an increase of the ionic conductivity with temperature in an exponential fashion: $\sigma T = A_o \times \exp(-E_a/kT)$, where $E_a$ is the activation energy for ion transport in the crystal lattice, k is the Boltzmann constant, and $A_o$ is the intercept of the $\log(\sigma T)$ versus 1/T plot. The $E_a$ derived from the slopes of the Arrhenius plots are 0.26 and 0.18 eV for the $Li_3OCl$ and $Li_3OCl_{0.5}Br_{0.5}$ anti-perovskites, respectively, rather low values.

Figure 4:
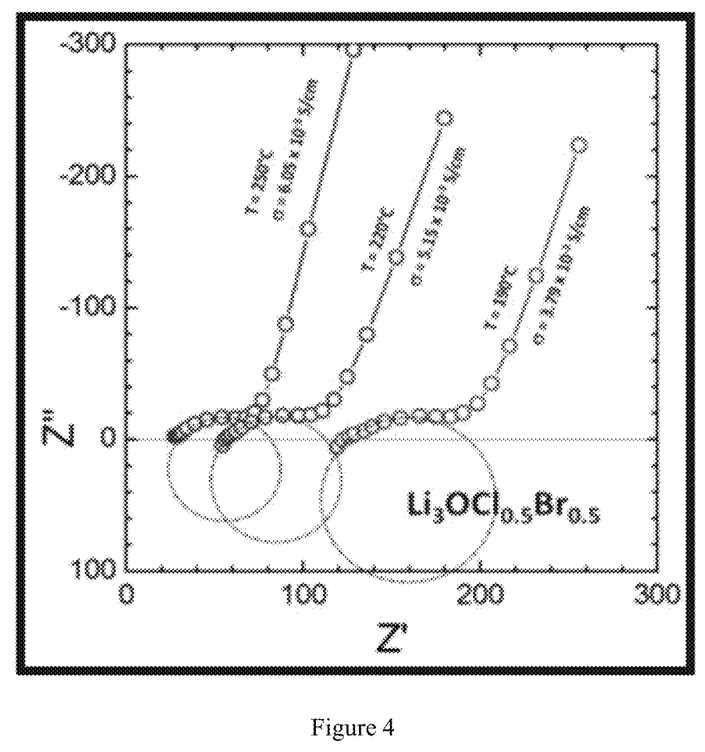
FIG. 4. Impedance spectroscopy Nyquist plots of the real and imaginary components of the anti-perovskite impedance measured at different temperatures—impedances are in ohms.

The $Li_3OCl$ and $Li_3OCl_{0.5}Br_{0.5}$ anti-perovskite data plotted in FIGS. 4 and 5 have the following specifications for sample preparation:

(1) The anti-perovskites in the molten state were kept at a high temperature of 330-360° C. for a long period of time (approximately 100 h), to ensure complete water removal. During this process the volatile elements chlorine and/or bromine may have escaped from the crystal lattice in distinct amounts (not in a controlled way, though; quantification of this process of Li and Cl removal is in progress), and the corresponding amount of lithium may be reduced concurrently, as shown in FIG. 1 (right), resulting in the "depleted" antiperovskites noted as $Li_{3-\delta}OCl_{1-\delta}$ and/or $Li_{3-\delta}O(Cl_{0.5}Br_{0.5})_{1-\delta}$.

(2) The molten anti-perovskite was poured and spread on a flat aluminum foil to form a "pancake" sample, one then cut the crystalline bulk into a disk-shaped sample without crushing it into a pellet so as to diminish grain boundary effects. (3) A sputtering technique was used to coat gold layers on the flat surfaces of the samples disks, as well as gold foils, to increase the sample contact at the electrode interfaces. The foregoing techniques may be useful in the measurement of ionic conductivity of the $Li_3OCl$ and $Li_3O(Cl,Br)$ anti-perovskites.

Without being bound to any particular theory, one reason that mixed-halogen phase $Li_3O(Cl,Br)$ shows a higher ionic conductivity than the end member antiperovskites is likely due to its peculiar topological nature, FIG. 1. The end member $Li_3OBr$ has large Br anions that almost completely fill the dodecahedral A-site of the antiperovskite, which leaves little room for $Li^+$ cations to hop in the interstitial space. In the other end member, $Li_3OCl$, with smaller $Cl^-$ anions that are not large enough to fill the dodecahedral space substantially, the perovskite structure distorts via octahedral tilting, which results in (partially) collapsed A sites (the coordination goes from 12 to 8, correspondingly). This low-symmetry phase still leaves no significant channels for ionic transport. Alternating larger Br and smaller Cl anions in the dodecahedral A-sites in a 3D topology generates a larger unit cell closer to the end member $Li_3OBr$. Simultaneously, it straightens the octahedral tilting, which results in a less distorted perovskite structure with larger 12-coordinated dodecahedra for the smaller Cl anion to reside. Such a topological setting provides free space in the chlorine-occupied dodecahedra for the $Li^+$ cations to hop in and pass through via the interstitial Frenkel route.

Advanced superionic conductivity is achieved eventually at high temperatures as significant structural disordering generates a large amount of vacancies for $Li^+$ on-site hopping, while the large thermal vibration of lithium at the vertices of the octahedral drastically enhances the ionic hopping probability. Whereas the two end member anti-perovskites, $Li_3OCl$ and $Li_3OBr$, reach superionic conducting of $\sigma > 10^{-2}$ S/cm at T>250° C. (about 30 degrees below the melting temperatures), as indicated by the significant jump at high temperatures (at $1/T < 1.9 \times 10^{-3}$ in FIG. 5), the conductivity of the 50/50 mixed halogens sample $Li_3OCl_{0.5}Br_{0.5}$ goes above $10^{-2}$ S/cm (1 S/m) at an even lower temperature of 232° C., then quickly achieves advanced superionic conduction of $10^{-1}$ S/cm (10 S/m) at 248° C., and eventually gets to $10^0$ S/cm (100 S/m) at 266° C. The ionic conductivity of the anti-perovskites is comparable to that of other actively studied lithium conductors such as $Li_3N$ and $Li_7La_3Zr_2O_{12}$, or $Li_{10}GeP_2S_{12}$. It is also comparable to that of some liquid electrolytes.

The ionic conductivity of the anti-perovskites can be further improved by introducing transport channels via doping and/or depleting, as illustrated in FIG. 1, mainly to promote the lithium/vacancy on-site hopping and/or to pass through the free spaces of the empty dodecahedral A-sites. The deliberate and combined approaches of A-mixing, M-doping, and LiA-depleting can optimize anti-perovskites $Li_{3-x-\delta}M_{x/2}O(A_{1-z}A'_z)_{1-\delta}$ to achieve higher superionic conductivity.

The lithium-rich anti-perovskites may, in some cases, be hygroscopic and it may be advantageous to prevent their exposure to atmospheric moisture. Exemplary synthesis, material handling, and all subsequent measurements were performed in dry glove boxes with controlled dry inert atmosphere. In early measurements, all three samples of $Li_3OCl$, $Li_3OBr$, and $Li_3OCl_{0.5}Br_{0.5}$ showed rather low ionic conductivities in the range of $10^{-7}$ S/cm at room temperature.

Upon annealing in vacuum above 250° C. (but below the melting point) for 24 h, the measured ionic conductivity showed significant improvement, by as much as 2 orders of magnitude. This was also accompanied by a change in the slope of the Arrhenius curve, denoting a change in activation energy for Li transport. Without being bound to any particular theory, these changes are most likely indicative of structural changes (e.g., octahedral tilting), grain boundary changes, and migration of vacancies. As noted above, texture appears as a result of different cooling rates at the end of sample synthesis. The subsequent thermal/physical history of a sample (annealing, heating/cooling, pressing, thermal/electrochemical history, etc.) seems to affect the measured conductivity to a greater or lesser extent.

Although the material is lithium-rich, the $Li^+$ cations are bonded tightly at the octahedral vertices and coordinated with two oxygen anions as nearest neighbor, which provides no ionic hopping mechanism and thus results in low conductivity in early low-temperature measurements. It may be mainly due to the lack of vacancies in the crystal structure, i.e. sluggish ionic hopping via the Schottky route for the neighboring lattice sites. The situation gradually changes as temperature increases, and structure disordering occurs in association with enhanced thermal vibration. This is particularly true for the lithium sites where the thermal vibration shows much larger magnitude at high temperatures when phonon softening occurs.

In some cases, thermal treatment history and pellet texture influence the conductivity results. Crystallization kinetics, texture formation and evolution, octahedral tilting, and grain boundaries affect microstructure, and, therefore, ionic conductivity. Slow structural relaxation effects have been observed over a period of days. These effects are not new and can be particularly pronounced in some perovskites. For consistency, pellets for ionic conductivity measurements have been prepared following standard techniques of pressing or melting under inert atmosphere, and followed by prolonged annealing (>24 hours) in vacuum at temperatures varying between 150° C. and 250° C. A sputter coater is then used to deposit gold contacts on each side of the pellet. Gold foils (100 microns) are placed between the sputtered gold contacts on the pellet and the brass/copper electrodes used in the measurements. Spring loading maintained good contact between the electrodes and the pellet.

The disclosed lithium-rich solid electrolytes based on the anti-perovskite offer a number of applications. For example, Li-rich antiperovskites represent advances in electrochemistry systems as a cathode material that offers a variety of possible cation and/or anion manipulations. Indeed, the low melting point of the anti-perovskites enables the straightforward fabrication of thin films, which is useful in the fabrication of layered structures and components for high-performance battery/capacitor devices with existing technology. The anti-perovskites have a high Li concentration; display superionic conductivity, low activation energy, and very low electronic conductivity; and offer a comparatively large operation window in voltage and current. The products are lightweight and can be formed easily into sintered compacts. The disclosed anti-perovskites are readily decomposed by water to lithium hydroxide and lithium halides of low toxicity and are therefore completely recyclable and environmentally friendly. The low cost of the starting materials and easy synthesis of the products in large quantities present economic advantages as well. The Li-rich anti-perovskites thus represent a material capable of structural manipulation and electronic tailoring.

Lithium-rich antiperovskites may be synthesized by reacting an alkalai metal with lithium hydroxide at temperatures that suitably exceed 270 degrees Celsius in vacuo. The dynamic removal of water during the reaction forces the chemical equilibrium (shown in the equation below) toward the product and drives the reaction to completion. Hydrated lithium hydroxide ($LiOH.H_2O$) may be used if it is dehydrated in situ during the initial heating phase of the synthesis.

Further exemplary syntheses follow. In one such synthesis, stoichiometric amounts of LiX and LiOH are suitably mixed and carefully ground together to form a fine powder. The mixing/grinding is typically done using a mortar and pestle, a ball mill, or other like method.

The resulting fine power may be placed in a vessel (e.g., quartz or fused silica tube) of sufficient size and strength. A sufficient wall thickness is a wall thickness• typically greater than 1.5 mm. The vessel may be attached to a Schlenk line equipped with a water trap and a vacuum apparatus capable of establishing a vacuum better than 10 mTorr. A heater (e.g., electric tube furnace) is placed near to or even in contact with the vessel. The furnace suitably heats the portion of the vessel that contains the powder as well as additional parts of the vessel.

After establishing a vacuum (e.g., more than 10 mTorr) for a few minutes, the furnace may be turned on and temperature is ramped up. This is suitably done in a comparatively slow manner, e.g., 0.1, 0.5, 1.0, 2.5, or 5.0 degrees Celsius per minute, to a temperature of, e.g., at least 270 degrees Celsius for a reaction in the solid state, although higher temperatures may also be used. A temperature of, e.g., 330 degrees Celsius results in a product having a molten state at the end of the reaction. The temperature may be adjusted so as to not to exceed 360 degrees Celsius. Reaction temperatures in which the product reaches the molten state are considered especially suitable because of good mixing and good water removal. The vessel may be held at the maximum reaction temperature for a period of several hours or even a few days. Additional heating may be applied at lower temperatures.

Following a heating period, the vessel may be backfilled with an inert gas (e.g., $N_2$, Ar, He, or other noble gas) and is cooled. The cooling may be done in a variety of ways, for example:

(a) fast quenching in liquid nitrogen: The sealed vessel is disconnected from the Schlenk line, the heating element is removed and the vessel is plunged in liquid nitrogen.

(b) slower quenching: the vessel is disconnected from the Schlenk line at high temperature and the liquid is poured onto a cold (or cooled) surface (such as a metal), resulting in the formation of a solidified mass of material. This step may be performed under inert atmosphere.

(c) fast cooling: The vessel remains connected to the Schlenk line, but the heating element surrounding the tube is removed. The vessel is allowed to cool in contact with the atmosphere.

(d) slower cooling: A tube furnace is kept around the vessel and turned off (natural cooling) or a temperature ramp is programmed to take the sample down to room temperature.

Alternatively, cooling may be effected by contacting the melt composition with a substrate having a temperature lower than the temperature of the melt composition.

After the synthesis, the product may be very hygroscopic, and is suitably handled under inert atmosphere for protection against exposure to atmospheric moisture.

The recovered material may be ground to a fine a powder and may also be annealed (e.g., at 250 degrees Celsius) under vacuum for a period of time, e.g., 1, 10, 20, or even 50 hours. Without being bound to any particular theory, this may decrease grain boundary concentration, relieve disorder and distortion, and improve ionic conductivity of the product.

The quenching step influences the morphology of the product. Faster quenching tends to result in structures closer to the ideal cubic perovskite structure with minimal tetragonal distortion. Slower cooling tends to produce a structure with larger disorder (more tetragonal and/or orthorhombic distortion). The residual amount of disorder is relatively difficult to control. The level of residual distortion impacts directly the ionic conductivity of the product material. Annealing improves microstructure, crystallinity, and long-term stability of the product material.

The material thus synthesized shows a characteristic pseudo-cubic structure characteristic of the space group P m-3 m with x-ray powder diffraction. Fourier Transform Infrared Spectroscopy shows no bands characteristic of either water or —OH in the bending or stretching region of the absorption spectrum.

As described elsewhere herein, the disclosed compositions are easily generalized. For example, Li vacancies can be introduced in the parent material by doping with a divalent or trivalent metal: $Li_{(3-x)}M_{x/2}OX$ or $Li_{(3-x)}N_{x/3}OX$, where M is a divalent metal such as the alkaline-earth metals (Be, Mg, Ca, Sr, Ba), N is a trivalent metal or semi-metal (e.g., B or Al), and X is a halogen or combination of halogens. The use of combinations of halogens permits the introduction of lattice distortions, which affect ionic conductivity: $Li_3OX_zY_{(1-z)}$ where X and Y are any of the halogens (F, Cl, Br, I). These two methods can be combined to produce metal-doped samples with all combinations of halogens consistent with the perovskite stoichiometry. It should be understood that compositions according to the present disclosure may include one or more metal dopants and one or more halide species.

Exemplary Synthesis of $Li_3OCl$

In one exemplary experiment, 4.24 g of LiCl (0.1 mol) is mixed with 4.78 g of LiOH (0.2 mol). All reagents are ACS grade and are used as received after drying under vacuum for 1 hour at 60 degrees Celsius. The powders are carefully ground together (mortar/pestle or ball-mill) to achieve a high degree of mixing and a fine powder. The powder is placed in a quartz tube (2 cm diameter, 1.5 mm wall thickness), and the tube is attached to a Schlenk line with a vacuum pump capable of producing a vacuum better than 10 mTorr. A cold trap is inserted between the Schlenk line and the pump for the pump's protection if warranted. A tube furnace or tubular heater is placed around the quartz tube. The tube and the Schlenk line are evacuated for a few minutes, at which point heating is started at a rate of approximately 1 degree Celsius per minute to a final temperature of 330 degrees Celsius. Temperature is maintained at 330 degrees Celsius for 48 hours. At the end of this period, vacuum is interrupted, the tube is backfilled with an inert gas, and the liquid sample is quenched by plunging the sealed tube in liquid nitrogen. The recovered material is annealed for 24 hours in vacuo. The yield is quantitative.

Exemplary Synthesis of $Li_3OCl_{0.5}Br_{0.5}$ 4.78 grams of LiOH (0.2 mol) are ground with 2.12 grams of LiCl (0.05 mol) and 4.34 g of LiBr (0.05 mol) are ground together (mortar/pestle or ball-mill) for a few minutes. The resulting fine powder is placed in a 2 cm diameter thick-walled (>1.5 mm wall thickness) quartz tube. The tube is attached to a Schlenk line. A vacuum better than 10 mTorr is established and the sample is heated to 330 degrees Celsius at a rate of 1 degree Celsius per minute with a tube furnace surrounding the quartz tube containing the sample. Heating is maintained for 60 hours, at which point the tube furnace is turned off and the sample is allowed to cool naturally in the cooling furnace under vacuum. Subsequently, the temperature is raised to 250 degrees Celsius (with the tube still under vacuum) and kept at this temperature for 24 hours to anneal the sample. The Schlenk is backfilled with argon, and the sample is again allowed to cool to room temperature by turning the furnace off.

Exemplary Synthesis of $Li_{2.7}Mg_{0.15}OCl$ 4.78 grams of LiOH (0.2 mol) are mixed (grinding or ball-milling) with 2.97 grams of LiCl (0.07 mol), and 1.43 grams of MgCl2 (0.015 mol). The powder is placed in a thick quartz tube (>2 cm diameter). The tube is attached to a Schlenk line and a vacuum better than 10 mTorr is established. The tube is heated at a rate of approximately 1 degree Celsius per minute to 350 degrees Celsius and is kept at that temperature for 40 hours; in some cases, the user may wish to maintain that temperature for a minimum of 40 hours. At the end of this period, the tube is backfilled with argon, and the liquid is poured on a cold aluminum plate in an atmosphere of argon. The solidified material is recovered, broken up in pieces and annealed under vacuum at 250 degrees Celsius for 24 hours before use. Annealing may be performed at other temperatures; temperature above 150 deg. C. are considered especially suitable for improving ionic conductivity. In some—but not all—embodiments, temperatures above 250 deg. C. applied for an extended period of time result in material loss by sublimation It should be understood that the foregoing exemplary syntheses may be used to create a product composition that comprises the formula $Li_3OA$, the formula $Li_{(3-x)}M_{(x/2)}OA$, wherein A is a halide (or mix of halides) and M is a divalent metal; the formula $Li_3OX_zY_{(1-z)}$, wherein which X and Y are halogens; the formula $Li_{(3-x)}N_{x/3}OA$, wherein A is a halide and N is a trivalent metal, or even $Li_3OX_zY_{(1-z)}$, wherein X and Y are halogen.

As explained elsewhere herein, it should be understood that in any of the foregoing, a composition having the formula $Li_3OA$ may include one or more dopants (e.g., divalent and/or trivalent metals) as well as a mixture of halogens. Put another way, a composition may include a dopant and multiple halogens, or even a mixture of dopants and a halogen, or even a mixture of dopants and a mixture of halogens. As one example $Li_3OM1_aM2_bOX_zY_{(1-z)}$ is within the scope of the present disclosure, where M1 and M2 are metallic dopants, and X and Y are halides. (For the sake of notational simplicity, not all subscripts are necessarily shown in the foregoing formula.)

What is claimed:

1. A solid electrolyte composition, comprising:
   (a) the formula $Li_3OCl$,
   (b) the formula $Li_{(3-x)}M_{x/2}OA$,
   wherein $0<x\leq3$,
   wherein M comprises magnesium, calcium, barium, strontium, and mixtures thereof, and
   wherein A comprises fluoride, chloride, bromide, iodide, or a mixture thereof,
   (c) the formula $Li_{(3-x)}N_{(x/3)}OA$,
   wherein N is a trivalent metal,
   wherein $0\leq x\leq3$, and
   wherein A comprises fluoride, chloride, bromide, iodide, or a mixture thereof, or
   (d) the formula $Li_3OX_zY_{(1-z)}$,
   wherein X and Y are different halides, and
   wherein $0\leq z\leq1$.

2. The solid electrolyte composition of claim 1, wherein M is magnesium and A is chloride.

3. The solid electrolyte composition of claim 1, wherein M is magnesium and A is bromide.

4. The solid electrolyte composition of claim 1, wherein A is a mixture of bromide and chloride.

5. The solid electrolyte composition of claim 1, wherein x is 0.10 and A is chloride, bromide, or a mixture of chloride and bromide.

6. The solid electrolyte composition of claim 1, wherein M is magnesium, A is chloride, and x is 0.10.

7. An electrochemical device comprising a solid electrolyte composition of
   (a) the formula $Li_3OCl$,
   (b) the formula $Li_{(3-x)}M_{x/2}OA$,
   wherein $0\leq x\leq2$,
   wherein M comprises magnesium, calcium, barium, strontium, or a mixture thereof, and
   wherein A comprises fluoride, chloride, bromide, iodide, or a mixture thereof, or
   (c) the formula $Li_{(3-x)}N_{(x/3)}OA$,
   wherein N is a trivalent metal, and
   wherein A comprises fluoride, chloride, bromide, iodide, or a mixtures thereof, and
   wherein $0\leq x\leq3$, or
   (d) the formula $Li_3OX_zY_{(1-z)}$,
   wherein X and Y are different halides, and
   wherein $0\leq z\leq1$.

8. The electrochemical device of claim 7, wherein M is magnesium and A is chloride.

9. The electrochemical device of claim 7, wherein M is magnesium and A is bromide.

10. The electrochemical device of claim 7, wherein A is a mixture of bromide and chloride.

11. The electrochemical device of claim 7, wherein x is zero and A is chloride, bromide, or a mixture of chloride and bromide.

12. The electrochemical device of claim 7, wherein A is chloride, M is magnesium, and x is 0.15.

13. The electrochemical device of claim 7, wherein the electrochemical device includes a battery.

14. The electrochemical device of claim 7, wherein the electrochemical device includes a capacitor.

15. A method for producing the solid electrolyte composition of claim 1, the method comprising:
heating in a vessel, under essentially water-free conditions, an admixture of a powder comprising lithium hydroxide and a powder comprising a lithium halide, the heating being performed so as to covert at least a portion of the admixture to a melt composition; and
cooling the melt composition so as to give rise to a product composition.

16. The method of claim 15, wherein the heating is performed under a vacuum.

17. The method of claim 15, wherein the admixture is heated to a temperature of at least about 270 degrees C.

18. The method of claim 15, wherein the heating is performed under an inert atmosphere.

19. The method of claim 18, wherein the inert atmosphere comprises argon, nitrogen, helium, or any combination thereof.

20. The method of claim 15, wherein the cooling comprises cooling the vessel using liquid nitrogen.

21. The method of claim 15, wherein the cooling comprises contacting the melt composition with a substrate having a temperature lower than the temperature of the melt composition.

22. The method of claim 15, wherein the product composition is an antiperovskite composition.

23. The method of claim 15, further comprising annealing the product composition.

24. The method of claim 15, wherein the product composition comprises: the formula $Li_3OA$, the formula $Li_{(3-x)}M_{(x/2)}OA$, wherein A is a halide and M is a divalent metal, the formula $Li_3OX_zY_{(1-z)}$, wherein which X and Y are halogens, the formula $Li_{(3-x)}N_{x/3}OA$, wherein A is a halide and N is a trivalent metal, or any combination thereof.

* * * * *